Reissued Feb. 3, 1931

Re. 17,946

UNITED STATES PATENT OFFICE

BENJAMIN W. FREEMAN, OF CINCINNATI, OHIO

METHOD OF MAKING BOOTS AND SHOES

No Drawing. Original application filed November 27, 1923, Serial No. 677,319. Divided and this application filed May 31, 1928. Serial No. 282,056. Original No. 1,745,668, dated February 4, 1930. Application for reissue filed November 26, 1930. Serial No. 498,504.

My present invention is an improved and novel process in the manufacture of boots and shoes, having cut out uppers, and relates particularly to the method of reenforcing such shoe uppers in order that the lasting operation will not unduly distort the cut out designs, the present case being a division of my copending application, Ser. No. 677,319, filed Nov. 27, 1923, now Patent No. 1,675,295, issued June 26, 1928.

In the manufacture of boots and shoes, particularly ladies' shoes, low cut shoes, pumps, slippers, sandals and the like, it is very important to form "cut out" designs on the shoe uppers, some of which are of very intricate and involved contour, which designs, in order to be made, are cut out of the shoe uppers before the uppers are assembled on a shoe last, and consequently before the lasting operation. The subsequent lasting operation wherein the leather is stretched, pulled, and worked over a last would normally tend to distort practically all cut out designs, and hence ruin the completed shoe. In order to protect the shoe upper while permitting the cut out operation, before, assembly, particularly on the last, it is important to apply reenforcing materials, lining, layers or strengthening devices.

In my parent application, above referred to, I have explained and claimed various methods of reenforcing, and in the prior patent to B. B. Brodfeuhrer, No. 1,605,916, issued Nov. 9, 1926, other reenforcing methods are described and claimed.

In the present application I have elected to claim the reenforcing method or process which consists, generally, in assembling the shoe upper materials, usually comprising the vamp, quarters, and lining over all, or a portion of the same, and associating therewith, preferably between the upper and the lining, or a part of the same, a reenforcing layer or sheet. This reenforcing layer may be of canvas, textile material, or any other material desired, and may be of sufficient extent to cover the part of the shoe upper intended to be cut out, and also may be sufficient to be included in one or more of the lines of stitching uniting the shoe upper materials together. Thereupon the shoe upper, when fitted or formed, is subjected to the cutting out operation as now commercially practiced wherein the upper and lining, and the associated reenforcements are cut entirely through, and substantial openwork sections are removed therefrom. By having the shoe upper material, such as leather, suede or the like outer surface, and the interior lining, covering and enclosing the reenforcing layer, the latter may be left permanently within the shoe after the cut out action, the reenforcing layer having performed its function of preventing the distorting of the openwork designs during the lasting operation.

Formerly it was considered necessary to make the shoe and lining in the usual way, then apply the reenforcing, either outside or inside, and remove the same, while one of the features of my present invention is directed to cover and protect the feature of permitting the reenforcing layer to be left within the shoe, particularly when it is incorporated therein between the outer upper materials and the lining, or a portion of the same.

It will, therefore, be seen that in accordance with this invention, the upper is prepared for lasting by associating reenforcing material with the upper material in the cut out region, (that is the region where the openwork or cut out design is to be located), in order to form a fitted or closed upper which is reenforced in the cut out region; the openwork or design is then formed by cutting through the upper and reenforcing materials of the fitted or closed upper. In accordance with an embodiment of this invention, the reenforcing material is permanently united with the upper material in the cut out region, and this may be accomplished, as heretofore described, by securing the reenforcing material between the upper and lining in the cut out region. The reenforcing material, after performing its function of preventing distortion of the openwork or design during lasting and even during subsequent operations, can, therefore, be left within the shoe.

It will be noted that the cutting operation is performed on the reenforced upper while the latter is in a fitted or closed condition as distinguished from a flat condition. It is highly desirable, therefore, that the shape of the fitted or closed upper be left unimpaired and that the same be not distorted during the cutting operation. As heretofore described, the fitted or closed reenforced upper is subjected to a cutting operation as now commercially practiced. That operation is fully described in the parent application (now Patent No. 1,675,295), wherein it is stated that this operation can be performed by means preferably of the machine shown in my copending application Ser. No. 678,213, filed December 3, 1923, (now Patent No. 1,681,033, granted August 18, 1924). The machine of that patent is provided with a cutting anvil or cutting die, provides a suitable support and has provisions to form or cut the desired openwork design; this machine being provided with a gauging means in the form of a mask to aline the work in order to properly locate the cut out region with respect to the cutting anvil or die.

In accordance with an embodiment of this invention therefore, the fitted or closed upper, reenforced in the cut out region, is subjected to the cutting operation to form the openwork or design, while the fitted or closed reenforced upper is supported interiorly by placing the work on a support and alining the same thereon to locate the cut out region with respect to the cutting means. This is an important feature of this invention because the shape of the fitted or closed reenforced upper is left unimpaired and distortion thereof is obviated. No preliminary marking of the design on the upper is required; for the work is supported as well as alined to locate the cut out region with reference to the cutting means.

The method or process embodying this invention is of particular utility in the making of low cut shoes. In low cut shoes, the cutouts are placed in the fitted upper where the latter forms a shaped, closed in structure. If such a fitted or closed upper is even partially laid out flat, it tends to loosen up or to be otherwise distorted; indeed, in most instances, it is not practical to lay out a portion of such an upper on a block where the cut-out design is usually placed. By, however, supporting such a fitted or closed upper interiorly, as by placing the same on a support, the shape is left unimpaired and distortion thereof is obviated.

While I have shown and described a preferred embodiment of this invention, it will be understood that certain features, operations and sub-combinations are of utility and may be employed without reference to other features, operations and sub-combinations; that is contemplated by and is within the scope of the appended claims. It is, furthermore, to be understood that various changes may be made in details or operations, within the scope of the appended claims, without departing from the spirit of this invention. It is, therefore, to be understood that this invention is not to be limited to the specific details and operations described.

Having thus described my invention, what I claim as new is:

1. The improved process of making boots and shoes having cut out portions, which consists in associating reenforcing material with the upper and lining, and then cutting out said openwork portions through upper, lining, and reenforcement before lasting, relying upon the reenforcing to prevent distortion of the cut out upper during lasting and finishing the shoe with the reenforcement remaining therein.

2. The improved process of making boots and shoes having cut out portions in the upper materials, which consists in uniting a plurality of upper sections together with a reenforcement, and thereupon cutting out by a simultaneous action the said upper, lining, and reenforcing, and then assembling the upper with a sole, lasting, and completing the shoe.

3. The improved process of manufacturing shoes which consists in associating an upper, its lining, and reenforcing material together, cutting out a decorative design on a predetermined portion of the upper, the lining and the reenforcing material between the upper and the lining adjacent to the cut out design, lasting the shoe while maintaining undisturbed the relative positions of the remaining upper and remaining reenforcing material, and then completing the manufacture of the shoe.

4. The improved process of manufacturing shoes which consists in associating an upper, its lining, and reenforcing material between the upper and the lining adjacent to the design to be cut out, cutting out a decorative design on a predetermined portion of the upper, the lining and the reenforcing material, lasting the shoe while maintaining undisturbed the relative positions of the remaining upper and remaining reenforcing material, and then completing the manufacture of the shoe.

5. In the art of making boots and shoes having cut out uppers, the process of preparing the upper for lasting comprising, associating reenforcing material with the upper material in the cut out region to form a fitted or closed upper which is reenforced in the cut out region, and cutting through the upper and reenforcing materials of the fitted or closed upper.

6. In the art of making boots and shoes having cut out uppers, the process of preparing the upper for lasting comprising, associating reenforcing material with the upper material in the cut out region to form a fitted or closed upper which is reenforced in the cut out region, and cutting through the upper and reenforcing material while the shape of the fitted or closed upper is left unimpaired.

7. In the art of making boots and shoes having cut out uppers, the process of preparing the upper for lasting comprising, associating reenforcing material with the upper material in the cut out region to form a fitted or closed upper which is reenforced in the cut out region, and cutting through the upper and reenforcing material while the work is supported interiorly.

8. In the art of making boots and shoes having cut out uppers, the process of preparing the upper for lasting comprising, associating reenforcing material with the upper material in the cut out region to form a fitted or closed upper which is reenforced in the cut out region, supporting the work and aligning the same while so supported to locate the cut out region, and cutting through the upper and reenforcing material while so supported and aligned.

9. In the art of making boots and shoes having cut out uppers, the process of preparing the upper for lasting comprising, associating reenforcing material with the upper material in the cut out region to form a fitted or closed upper which is reenforced in the cut out region, supporting the work interiorly of the fitted or closed reenforced upper, aligning the work while so supported to locate the cut out region and cutting through the reenforced upper while so supported and aligned.

10. In the art of making boots and shoes having cut out uppers, the process of preparing the upper for lasting comprising, permanently uniting reenforcing material with the upper material in the cut out region to form a fitted or closed upper which is permanently reenforced in the cut out region, and cutting through the upper and reenforcing materials while the shape of the fitted or closed upper is left unimpaired.

11. In the art of making boots and shoes having cut out uppers, the process of preparing the upper for lasting comprising, securing reenforcing material between the upper and lining in the cut out region to form a fitted or closed upper which is reenforced in the cut out region, and cutting through the upper, lining and reenforcing while the shape of the fitted or closed upper is left unimpaired.

12. In the art of making boots and shoes having cut out uppers, the process of preparing the upper for lasting comprising, securing reenforcing material between the upper and lining in the cut out region to form a fitted or closed upper which is reenforced in the cut out region, supporting the work and aligning the same while so supported to locate the cut out region, and cutting through the upper, lining and reenforcement while so supported and aligned.

In testimony whereof I affix my signature this 20th day of November, 1930.

BENJAMIN W. FREEMAN.